United States Patent [19]

Schricker et al.

[11] Patent Number: 5,646,341
[45] Date of Patent: Jul. 8, 1997

[54] APPARATUS AND METHOD FOR DIAGNOSING AN ENGINE USING AN OIL PRESSURE MODEL

[75] Inventors: David R. Schricker; Rolland D. Scholl, both of Dunlap, Ill.

[73] Assignee: Caterpillar Inc., Peoria, Ill.

[21] Appl. No.: 507,128

[22] Filed: Jul. 28, 1995

[51] Int. Cl.$^6$ .................................................. G01M 15/00
[52] U.S. Cl. ................................. 73/117.3; 364/424.034
[58] Field of Search ........................... 73/115, 116, 117.1, 73/117.2, 117.3, 865.6; 364/424.03

[56] References Cited

U.S. PATENT DOCUMENTS

| | | | |
|---|---|---|---|
| 3,721,120 | 3/1973 | Howell et al. | 73/117.3 |
| 4,136,329 | 1/1979 | Trobert | 340/52 F |
| 4,368,705 | 1/1983 | Stevenson et al. | 123/357 |
| 4,604,701 | 8/1986 | Fujawa et al. | 364/431.01 |
| 4,616,616 | 10/1986 | Staniak et al. | 123/357 |
| 4,621,335 | 11/1986 | Bluish et al. | 364/550 |
| 4,630,189 | 12/1986 | Ohmori et al. | 364/150 |
| 4,671,107 | 6/1987 | Chiesa et al. | 73/118.2 |
| 4,736,715 | 4/1988 | Larsen | 123/64 |
| 4,765,291 | 8/1988 | Kurio et al. | 123/196 R |
| 4,774,918 | 10/1988 | Kurio et al. | 123/196 R |
| 4,882,905 | 11/1989 | Kawamura | 60/608 |
| 4,901,530 | 2/1990 | Kawamura | 60/608 |
| 4,953,110 | 8/1990 | Chartrand | 364/431.03 |
| 4,964,318 | 10/1990 | Ganoung | 74/859 |
| 5,010,487 | 4/1991 | Stonehocker | 364/424.03 |
| 5,050,081 | 9/1991 | Abbott et al. | 364/424.06 |
| 5,205,125 | 4/1993 | Potter | 60/602 |
| 5,377,112 | 12/1994 | Brown, Jr. et al. | 364/431.12 |
| 5,400,018 | 3/1995 | Scholl et al. | 340/825.54 |

FOREIGN PATENT DOCUMENTS

| | | |
|---|---|---|
| 0142101 | 5/1985 | European Pat. Off. . |
| 0231155 | 8/1987 | European Pat. Off. . |

*Primary Examiner*—Richard Chilcot
*Assistant Examiner*—Eric S. McCall
*Attorney, Agent, or Firm*—James R. Yee

[57] ABSTRACT

An apparatus and method for diagnosing an engine using a computer based model of the engine oil pressure.

15 Claims, 3 Drawing Sheets

APPARATUS AND METHOD FOR DIAGNOSING AN ENGINE USING AN OIL PRESSURE MODEL

TECHNICAL FIELD

This invention relates generally to an apparatus and method for providing engine diagnostics, and more particularly, to an apparatus and method for diagnosing an engine using a computer based model of oil pressure.

BACKGROUND

Proper maintenance of a vehicle's engine is an important priority in the daily operation of a vehicle. Without proper maintenance minor problems can escalate into major mechanical failures, resulting in costly downtime and expensive repairs. Thus, it is important to be able to detect indications of any problems so that the problems may be corrected early before failure.

The subject invention is directed at overcoming one or more of the problems as set forth above.

DISCLOSURE OF THE INVENTION

In one aspect of the present invention, an apparatus for modeling oil pressure of an engine is provided. The apparatus senses engine speed and engine oil temperature and responsively produces respective engine speed and oil temperature signals. An oil pressure polynomial function and the signals are used to determine a predicted value of the engine oil pressure.

In a second aspect of the present invention, a method of creating a computer based model of the engine oil pressure of an engine is provided. The method includes the steps of sensing engine oil pressure on a test engine and determining respective values for the constants of an engine oil pressure polynomial function as a function of the engine oil pressure values.

BEST MODE FOR CARRYING OUT THE INVENTION

Figure 1:
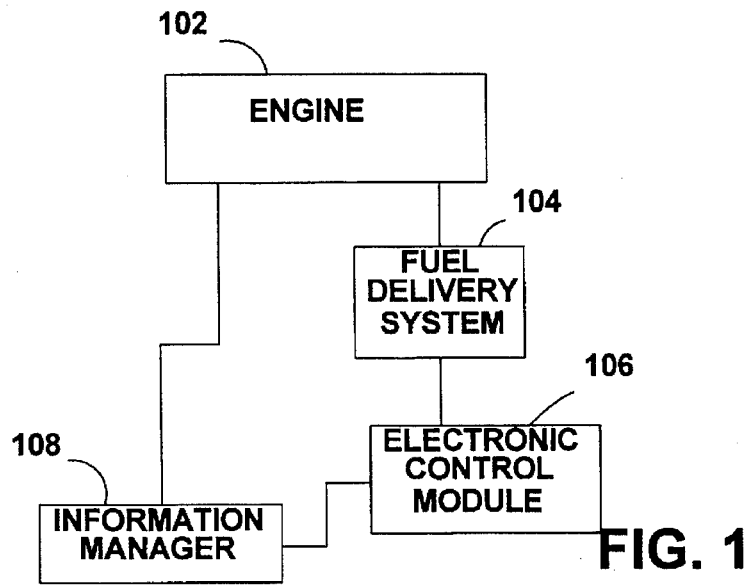
FIG. 1 is a block diagram of an engine and engine controlling apparatus.

With reference to FIG. 1, the present invention is adapted to diagnose an engine 102 using a computer based model of the engine oil pressure. The engine 102 is typically controlled by an electronic control module (ECM) 106. A fuel delivery system 104 controls fuel flow to the engine 102. Typically, the fuel delivery system 104 includes a fuel injection system or a electronic governor. The electronic governor controls the amount of fuel delivered to the engine.

An information manager 108 receives information from the ECM 106 and directly from sensors connected to the engine 102 and uses the engine information to diagnose the engine 102 (as discussed below). Preferably, the information manager 108 is microprocessor controlled.

In one embodiment, the information manager 108 performs on-board diagnostic routines using a model of the engine oil pressure and comparing the modeled value to the actual value. In a second embodiment, the information manager 108 records or stores the sensor information in a memory for download into an external computer for analysis. In a third embodiment, the information manager 108 includes a transmitter (not shown) for transmitting the data to a remote site for processing. A satellite or land based radio system receives the signals from the transmitter and relays the signals to the remote site. One suitable transmitter is the Omnitracs Mobile Messaging Communications Terminal. A suitable satellite system service is Omnitracs Message Service. Both are available from Qualcomm of San Diego, Calif.

Figure 2:
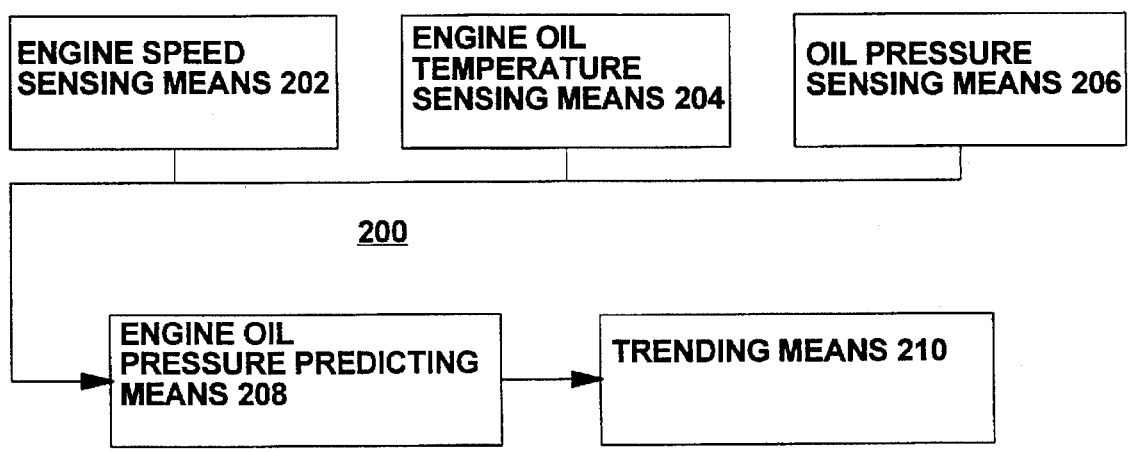
FIG. 2 is a block diagram illustrating operation of the present invention.

With reference to FIG. 2, the operation of the present invention or apparatus 200 is described.

A means 202 senses engine speed and responsively produces a engine speed signal (SPEED). In the preferred embodiment, the engine speed sensing means 202 includes an engine speed sensor (not shown).

A means 204 sensing engine oil temperature and responsively produces an engine oil temperature signal ($OIL_{TEMPERATURE}$). In the preferred embodiment, the engine oil temperature sensing means 204 includes an engine oil temperature signal (not shown). It should be noted that coolant temperature may be substituted for oil temperature.

A means 206 senses engine oil pressure and responsively produces an engine oil pressure signal ($OIL_{PRESSURE}$). In the preferred embodiment, the engine oil pressure sensing means includes an engine oil pressure sensor (not shown).

A means 208 receives the engine speed signal and the engine oil temperature signal and responsively determines a modeled engine oil pressure value using an oil pressure polynomial function and the engine speed and engine oil temperature signals.

A means 210 receives the modeled engine oil pressure value and the actual oil pressure signal, compares said modeled engine oil pressure value and the actual engine oil pressure signal, and responsively provides engine diagnostics.

In the preferred embodiment, the engine oil pressure polynomial function is:

$$\begin{aligned}\text{PREDICTED\_OIL\_PRESSURE} =\ & C0 + (C1 * \text{SPEED}) \\ & + (C2 * OIL_{TEMPERATURE}) \\ & + (C3 * (OIL_{TEMPERATURE})^2) \\ & + (C4 * OIL_{TEMPERATURE} * \text{SPEED}),\end{aligned}$$

where C0–C4 are the polynomial constants.

In the preferred embodiment, the polynomial constants are derived using test data. The test data may consist of actual oil pressure values measured during operation of a test vehicle. Test data must be measured during operation which fairly represents the environmental and application requirements of the engine for which the constants are being derived. Alternately, the test data may consist of engine oil pressure values derived from a simulation of the engine.

In the preferred embodiment, the polynomial constants are derived using a regression method based on least squares. However, any suitable method may be used.

Engine diagnostics may be performed in several ways. In one embodiment, the engine is diagnosed by comparing the actual oil pressure value and the modeled value and determining the difference. The difference is then compared with preset high and low limits. If the difference exceeds the boundaries of the preset limits, appropriate action may be taken. For example, a warning lamp might be lit which would signal the operator of a warning condition. A warning may also be stored with the data for analysis later or transmitted to a diagnostic center.

Additionally, the engine oil pressure model may be combined with a computer based model of another parameter of the engine. By analyzing the differences between the modeled values and the actual measured values for both parameters, the engine may be further diagnosed. For a discussion of such a system, see U.S. Pat. No. 5,377,112, issued to Brown, Jr, et al, on Dec. 27, 1994.

Figure 3:
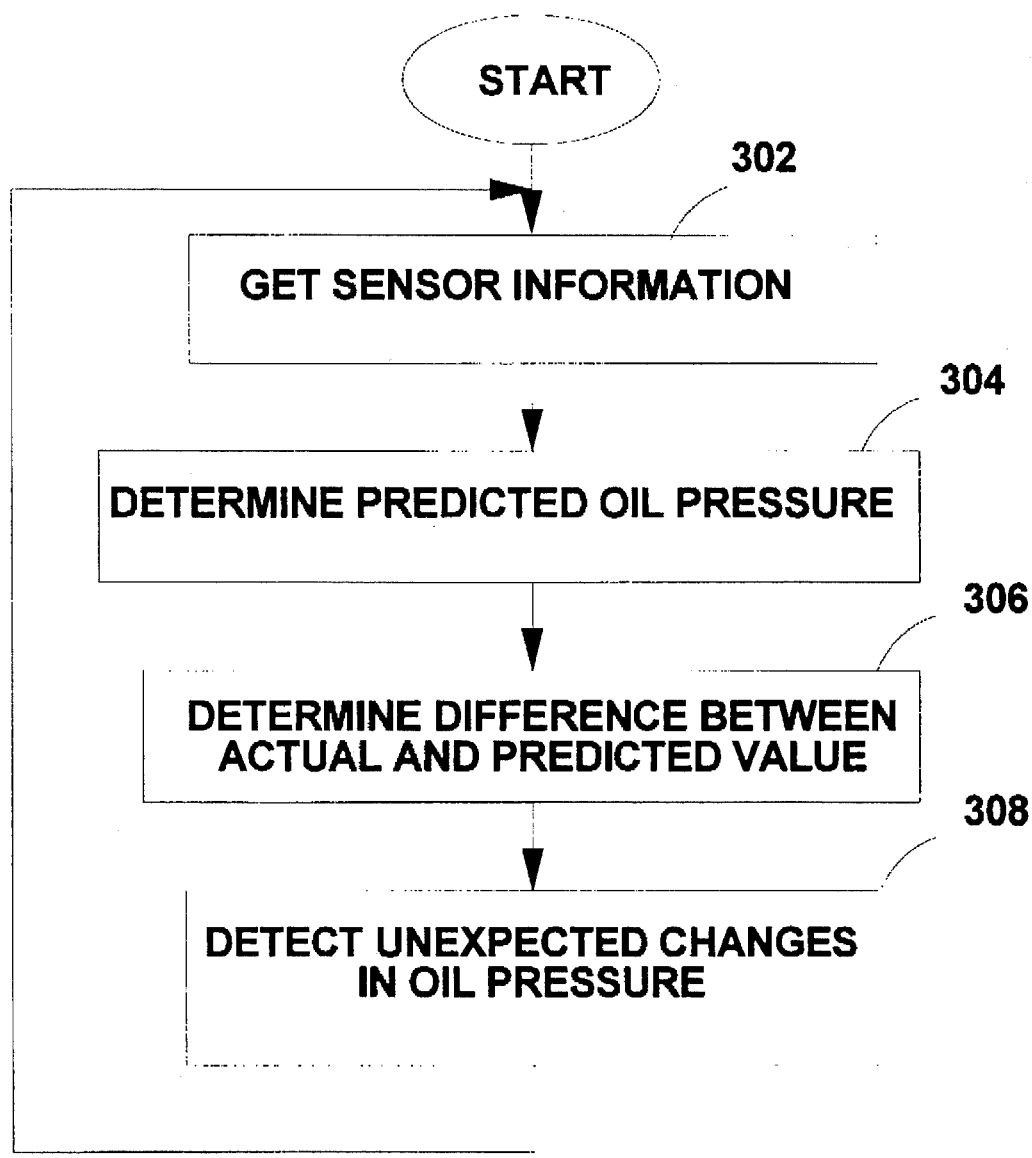
FIG. 3 is a flow diagram illustrating a portion of the operation of the apparatus of FIG. 2, according to an embodiment of the present invention.

With reference to FIG. 3, the operation of the present invention is discussed according to one embodiment. In a first control block 302, the sensor information is received. In a second control block 304, a predicted oil pressure value based on the sensor information is determined. In the preferred embodiment, the predicted oil pressure is determined using the equation above.

In a third control block 306, the difference between the actual and predicted values is determined. As the engine oil oxidizes, the viscosity of the oil also increases. This is a normal occurrence. However, unexpected changes may indicate a more serious problem in the engine or the engine oil pump. Unexpected changes in the viscosity of the oil will be seen in the difference between the actual and predicted oil pressure values. Thus, in the fourth control block 308, unexpected changes in the oil viscosity are detected based on the difference. For example, an increasing trend at some nominal rate is expected. A high rate of increase may be an indication of a coolant leak into the oil. A decreasing rate may be an indication of a fuel leak, an oil pump problem or bearing wear.

If the difference between actual and predicted values is positive and increases, then actual oil pressure is rising faster than predicted. If the difference exceeds an increase preset limit, then an unexpected change is said to occur.

If the difference between actual and predicted values is negative and the magnitude of the difference increases, then actual oil pressure is decreasing. If the difference exceeds a decrease preset limit, then an unexpected change is said to occur.

Preferably, the difference signal is accumulated into engine-hour trend points. Accumulation of data into trend is constrained by other dependency conditions. In the preferred embodiment, the dependency conditions include engine speed and coolant temperature. For example, data is collected while engine speed is less than 900 rpm and coolant temperature is greater than 77 C. Plus, these condition must exist for six seconds.

Figure 4:
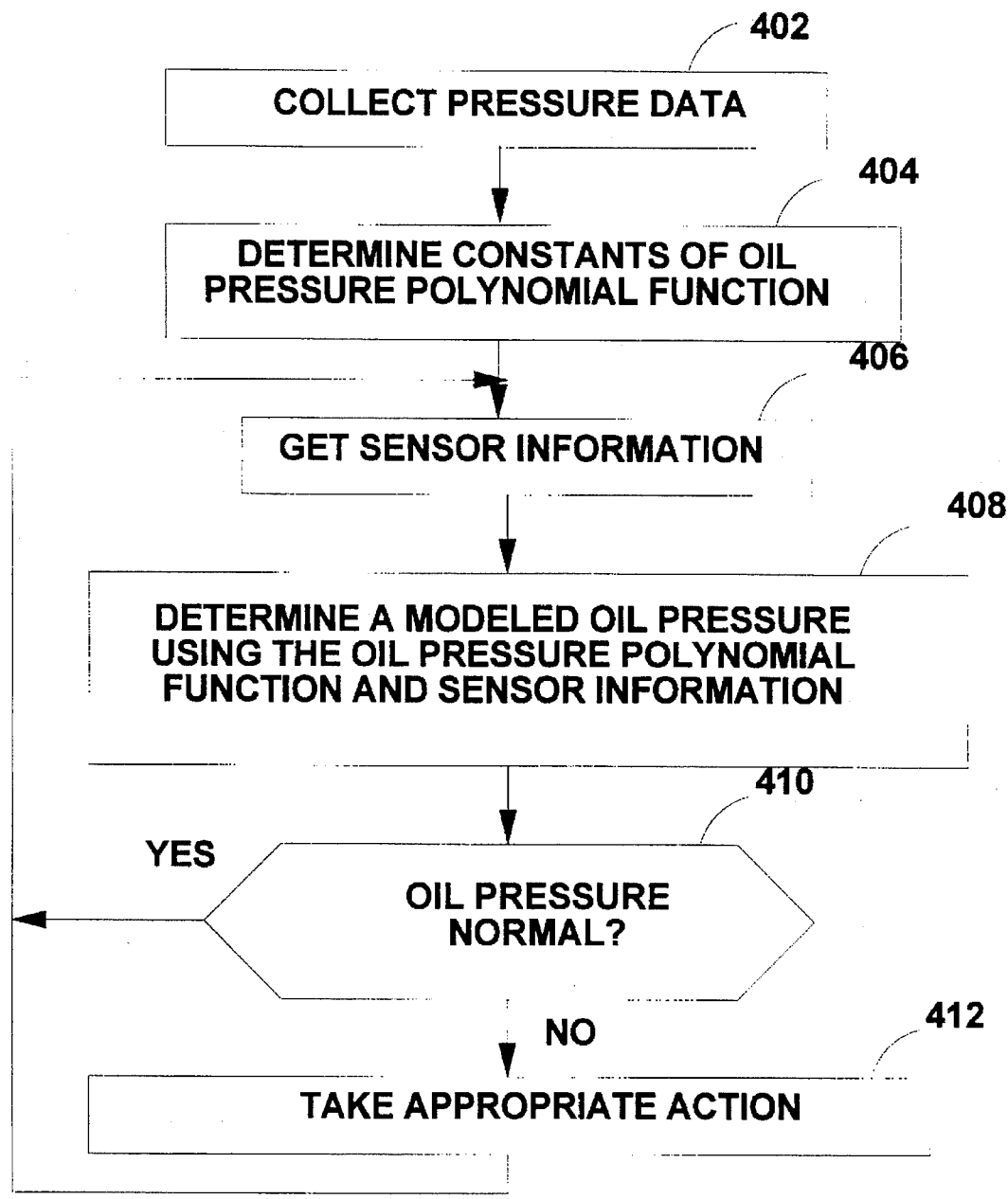
FIG. 4 is a flow diagram illustration a portion of the operation of the apparatus of FIG. 2 according to another embodiment of the present invention.

With reference to FIG. 4, a second embodiment, of the present invention is discussed. In a first control block 402, oil pressure data or test data is collected.

In a second control block 404, the oil pressure polynomial constants are determined. In a third control block 406, the sensor information from the engine 102 is retrieved. This may be done onboard or off-board.

In a fourth control block 408, the oil pressure polynomial is used to determine a modeled value of the oil pressure. In a first decision block 410, the data is analyzed to determine if the oil pressure is normal, i.e., are there any trends in the data indicative of any problem? If a trend indicative of a problem exists then appropriate action is taken as discussed above. Control then returns to the third control block 406 to repeat the process.

Industrial Applicability

With reference to the drawings and in operation, the present invention or apparatus 200 is adapted to provide engine diagnostics using a computer based oil pressure model. The apparatus is embodied in a computer program. Ideally, the present invention is run on an on-board computer for real-time diagnostics. However, the present invention may be run using off-loaded or downloaded data.

The apparatus receives sensor information from a plurality of sensors and/or from other modules. As described above, the sensor information is used to model oil pressure. Actual oil pressure is measured and the two are compared. The difference is used in diagnosing the engine.

One method of providing diagnostics is by comparing the difference between the actual and modeled values with a preset limit. If the difference exceeds the preset limit, the driver or operator can be notified via an on-board indicator such a lamp. Then, appropriate action such as servicing can be scheduled. Alternately, the stored data can be used in conjunction with reports from the driver of abnormalities in the engine's operation. A review of the stored data and the operator's description of the problem may be useful in identifying the source of the problem.

Other aspects, objects, and advantages of this invention can be obtained from a study of the drawings, the disclosure, and the appended claims.

We claim:

1. An apparatus for modeling oil pressure of an engine, including:

means for sensing engine speed and responsively producing an engine speed signal;

means for sensing engine oil temperature and responsively producing an engine oil temperature signal;

means for receiving said engine speed signal and said engine oil temperature signal and responsively determining a modeled engine oil pressure value using an oil pressure polynomial function and said engine speed and engine oil temperature signals.

2. An apparatus, as set forth in claim 1, including:

means for sensing actual oil pressure and responsively producing an actual oil pressure signal; and means for receiving said modeled oil pressure value and said actual oil pressure signal and responsively providing engine diagnostics.

3. An apparatus, as set forth in claim 2, wherein said engine diagnostics providing means includes means for comparing said modeled engine oil pressure value and said actual oil pressure signal and responsively producing a difference signal and for comparing said difference signal to a preset limit.

4. An apparatus for providing diagnostics for an engine by modeling engine oil pressure, including:

means for sensing engine speed and responsively producing an engine speed signal;

means for sensing engine oil temperature and responsively producing an engine oil temperature signal;

means for receiving said engine speed signal and said engine oil temperature signal and responsively determining a modeled engine oil pressure value using an oil pressure polynomial function and said engine speed and engine oil temperature signals;

means for sensing actual oil pressure and responsively producing an actual oil pressure signal; and means for receiving said modeled engine oil pressure value and said actual oil pressure signal, comparing said modeled engine oil pressure value and said actual engine oil pressure signal, and responsively providing engine diagnostics.

5. An apparatus, as set forth in claim 4, wherein said engine diagnostics providing means includes means for comparing the difference between the actual engine oil pressure signal and said modeled engine oil pressure value to a preset limit.

6. An apparatus, as set forth in claim 5, wherein said engine diagnostics providing means includes means for capturing said difference signal and storing said difference signal over time.

7. A method of creating a computer based model of an engine oil pressure of an engine, including the steps of:

sensing engine oil pressure on a test engine and responsively producing engine oil pressure values over a period of time;

storing said engine oil pressure values; and determining respective values for a set of constants of an engine oil pressure polynomial function as a function of said stored engine oil pressure values.

8. A method of creating a computer based model of an engine oil pressure of an engine, including the steps of:

sensing engine oil pressure on a test engine and responsively producing engine oil pressure values over a period of time;

storing said engine oil pressure values; and determining respective values for a set of constants of an engine oil pressure polynomial function as a function of said stored engine oil pressure values using a regression method based on least square error.

9. A method of creating a computer based model of an engine oil pressure of an engine, including the steps of:

sensing engine oil pressure on a test engine and responsively producing engine oil pressure values over a period of time;

storing said engine oil pressure values; and determining respective values for a set of constants of an engine oil pressure polynomial function as a function of said stored engine oil pressure values, wherein said engine oil pressure polynomial function is:

$$\begin{aligned}\text{PREDICTED\_OIL\_PRESSURE} = {} & C0 + (C1 * \text{SPEED}) \\ & + (C2 * \text{OIL}_{TEMPERATURE}) \\ & + (C3 * (\text{OIL}_{TEMPERATURE})^2) \\ & + (C4 * \text{OIL}_{TEMPERATURE} * \text{SPEED})\end{aligned}$$

where, SPEED is the speed of the engine, $\text{OIL}_{TEMPERATURE}$ is the measured oil temperature and C0–C4 are the polynomial constants.

10. A method for providing diagnostics of an engine, including:

sensing engine speed and responsively producing an engine speed signal;

sensing engine oil temperature and responsively producing an engine oil temperature signal;

receiving said engine speed signal and said engine oil temperature signal and responsively determining a modeled engine oil pressure value using an oil pressure polynomial function and said engine speed and engine oil temperature signals;

sensing actual oil pressure and responsively producing an actual oil pressure signal; and receiving said modeled engine oil pressure value and said actual oil pressure signal, comparing said modeled engine oil pressure value and said actual engine oil pressure signal, and responsively providing engine diagnostics.

11. A method, as set forth in claim 10, including the step of determining a difference signal between said model oil pressure value and said actual oil pressure signal.

12. A method, as set forth in claim 11, including the step of storing said difference signal over time.

13. A method, as set forth in claim 11, wherein said step of providing engine diagnostics includes the steps of:

comparing said difference signal to a preset limit; and, signaling an error when said difference signal exceeds said preset limit.

14. An apparatus for modeling oil pressure of an engine, including:

means for sensing engine speed and responsively producing an engine speed signal;

means for sensing engine coolant temperature and responsively producing an engine coolant temperature signal;

means for receiving said engine speed signal and said engine coolant temperature signal and responsively determining a modeled engine oil pressure value using an oil pressure polynomial function and said engine speed and engine coolant temperature signals.

15. A method of creating a computer based model of an engine oil pressure of an engine, including the steps of:

sensing engine oil pressure on a test engine and responsively producing engine oil pressure values over a period of time;

storing said engine oil pressure values; and determining respective values for a set of constants of an engine oil pressure polynomial function as a function of said stored engine oil pressure values.

\* \* \* \* \*